United States Patent Office 3,798,311
Patented Mar. 19, 1974

3,798,311
DIRECT SYNTHESIS OF FAUJASITE ZEOLITES
CONTAINING SODIUM AND LITHIUM
Jean-Louis Guth, Mulhouse, Albert Pereyron, Brunstatt, and Raymond Wey, Mulhouse, France, assignors to Azote et Produits Chimiques S.A.
No Drawing. Filed Sept. 20, 1971, Ser. No. 182,204
Claims priority, application France, Sept. 18, 1970, 7033911; Mar. 10, 1971, 7108244
Int. Cl. C01b 33/28
U.S. Cl. 423—329
15 Claims

ABSTRACT OF THE DISCLOSURE

Lithium-containing faujasites are produced without the necessity of an ion exchange step. A gel is first formed of an aluminosilicate containing all of the alumina required for the crystallization mixture. The gel is then modified by the addition of reactive silica and, if necessay, other components to yield specified molar ratios relating to $Al_2O_3$, $SiO_2$, $Na_2O$, $Li_2O$ and $H_2O$ values. The resultant crystallization mixture is treated to crystallize out the lithium-containing faujasite.

CROSS REFERENCE TO RELATED APPLICATION

This invention is related to applicant's application Ser. No. 178,794 filed Sept. 8, 1971, entitled "Preparation of Faujasite-Type Zeolites" and the disclosure of said application is incorporated by reference herein.

BACKGROUND OF THE INVENTION

This invention relates to a novel process for the preparation of zeolites of the faujasite type containing both sodium and lithium cations and to the zeolites prepared by this process.

Zeolites are crystallized aluminosilicates having a three-dimensional framework of $SiO_4$ and $AlO_4$ tetrahedra in which every oxygen atom is shared by two adjacent tetrahedra. The negative charges of the $AlO_4$ tetrahedra are balanced by alkali metal or alkaline-earth metal cations. Since the arrangement of $SiO_4$ and $AlO_4$ tetrahedra is regular, the zeolite structure comprises large cavities which are connected by channels containing water and balancing cations. After dehydration or activation, the zeolites selectively adsorb molecules having a dimension compatible with the size of the channels. Owing to this characteristic, zeolites have been called molecular sieves.

The zeolites have the following general formula:

$$M_{2/n}O, Al_2O_3, YSiO_2, zH_2O$$

where M is one or several metal cations, $n$ is their valence and Y and $z$ represent the number of moles of $SiO_2$ and $H_2O$ respectively.

The present invention, in particular, relates to a process for the preparation of a faujasite type zeolite, i.e., having a face-centered cubic lattice, a parameter $a_0$ ranging between 24.5 and 25 A., a structure of stacked cubic octahedra and hexagonal prisms as illustrated for example in Information Chimie, No. 76 (October 1969), p. 33, and containing $Na^+$ and $Li^+$ cations. As already known, the presence of $Li^+$ cations in zeolites brings about numerous advantages. Lithium cations are more easily exchangeable than, for example sodium cations; therefore, less contacts are necessary to obtain a given rate of exchange. Furthermore, faujasites containing $Na^+$ and $Li^+$ can advantageously be used for preparing catalysts by exchanging $Li^+$ by $La^{3+}$, rare-earth metals, etc. Still further, the presence of litium cations in a faujasite permits selective adsorptions, such as the adsorption of naphthenic compounds, for example.

Heretofore, faujasites containing $Na^+$ and $Li^+$ were prepared by a two step process. In a first step a faujasite containing only $Na^+$ cations was prepared from mixtures containing $SiO_2$, $Al_2O_3$, $Na_2O$ and $H_2O$ and then in a second step all of the lithium cations were introduced by ion exchange. Though there has been proposed a direct synthesis process for preparing a zeolite containing lithium:ZMS—3 zeolite, it has a different structure than the faujasite of the present invention, a hexagonal axis of symmetry, in particular, G. T. Kokotailo and J. Ciric (Second International Conference on Molecular Sieve Zeolites; Sept. 8–11, 1970, Worcester, Mass.).

SUMMARY OF THE INVENTION

A principal object of the invention is to provide a process permitting a direct synthesis, without ion exchange, of a pure faujasite containing both $Li^+$ and $Na^+$ cations and having the following composition:

$$1\pm0.2[(1-x)Na_2O; xLi_2O]; Al_2O_3; 2.3\text{--}6SiO_2$$

 $x$ ranging between 0.05 and 0.95.

Upon further study of the specification and appended claims, other objects and advantages of this invention will become apparent.

The direct synthesis of faujasite containing $Na^+$ and $Li^+$ presents numerous advantages because ion exchange reactions are generally long and arduous. Furthermore, aside from the omission of the ion exchange step, it has been found that the direct synthesis of faujasite containing $Li^+$ cations and $Na^+$ cations is economically superior to the synthesis of faujasite containing only $Na^+$. In this connection, it has been observed that faujasites can crystallize from amorphous mixtures having a lower $Me_2O/Al_2O$ molar ratio ($Me_2O$ being the total quantity of $$4Na_2O + Li_2O),$$

when the amorphous mixtures contain both $Li_2O$ and $Na_2O$ than when it contains only $Na_2O$. Not only is the amount of basic oxide lowered, but also the crystalline yield is increased when crystallizing faujasite from an amorphous mixture containing $Li_2O$ and $Na_2O$. Furthermore, for given $Me_2O/Al_2O$ molar ratios and $SiO_2/Al_2O_3$ ratios in the amorphous mixture, the required crystallization time is decreased when the mixture contains $Li_2O$.

According to the invention, the faujasite containing $Na^+$ and $Li^+$ cations is crystallized at a temperature ranging between 20 and 105° C. from an amorphous crystallization mixture containing the oxides constituting faujasite having the molar ratios set forth in Table I.

TABLE I

| Molar ratios | General range | Preferred range |
|---|---|---|
| $SiO_2/Al_2O_3$ | 2–16 | 2–10 |
| $(Na_2O$ plus $Li_2O)/Al_2O_3$ | 1.45–8 | 1.45–3.5 |
| $Li_2O/(Na_2O$ plus $Li_2O)$ | 0.05–0.95 | 0.05–0.5 |
| $H_2O/Al_2O_3$ | 76–300 | 100–200 |

The amorphous mixture is prepared as follows:

There is first prepared a gel of sodium and/or lithium aluminosilicate having the composition defined in Table II. This mixture contains all of the alumina necessary for the preparation of the amorphous crystallization mixture.

TABLE II

| Molar ratios | General range | Preferred range |
|---|---|---|
| $SiO_2/Al_2O_3$ | 1.5–3 | 2–2.5 |
| $(Na_2O$ plus $Li_2O)/Al_2O_3$ | 0.8–3.5 | 1–2.8 |
| $H_2O/Al_2O_3$ | 75–300 | 100–200 |

A solution of sodium or lithium silicate, water glass or meta-silicate can be used to prepare this first mixture, or instead silica can be dissolved in sodium or lithium hydroxide. The solution obtained is mixed, preferably with stirring, and at ordinary temperature, with a solution of sodium aluminate in proportions corresponding to those given in Table II until an homogeneous gel is obtained.

This gel can be immediately utilized without filtration, for the preparation of the amorphous mixture. But it is preferably filtered, washed and dried at a temperature not exceeding 80° C. before being used.

The amorphous crystallization mixture is prepared by adjusting the gel to the limits defined in Table I. The $SiO_2$ content is adjusted by adding, preferably at ordinary temperature, at least 0.5 mole of reactive amorphous silica, based on one mole of $Al_2O_3$. Generally amorphous silica having a particle size of less than 100 microns is added. Silica having a higher particle size is generally not reactive enough, and faujasite often cannot be crystallized from the amorphous mixture. Silica having a particle size less than $50\mu$ is preferably used. The $Na_2O$ and $H_2O$ contents are adjusted when necessary by adding water and sodium hydroxide. Whereas the entire quantity of $Li_2O$ necessary to adjust the composition (if any is necessary) is preferably introduced as lithium hydroxide, a minor portion of this necessary quantity can optionally be introduced by exchanging sodium ions in the gel. Practically, the quantity of $Li_2O$ introduced by ion-exchange should not exceed 50%.

As above said, faujasite is crystallized from the amorphous crystallization mixture at a temperature ranging between 20 and 105° C. At a temperature of 20° C. it takes 8 to 60 days to obtain a well crystallized zeolite. Higher temperatures permit shorter crystallization times. Thus, 4 to 15 days heating is necessary at 60° C. and 3 to 60 hours at 95° C. When performing crystallization at a temperature higher than 30° C., the amorphous crystallization mixture is preferably maintained at a temperature of 20 to 30° C. during 24 to 72 hours before heating at a higher temperature. Crystallization is preferably performed at a temperature lower than 100° C. as at higher temperatures, other zeolites besides faujasite begin to crystallize. Furthermore, if the amorphous mixtures have a high lithium content, for example, a content such that the molar ratio $LiO_2/[LiO_2+Na_2O]$ is higher than 0.5, lithium metasilicate begins to crystallize together with faujasite at a temperature higher than 80° C. Therefore, in such cases crystallization is performed at a temperature not exceeding 80° C.

When the reaction is terminated, the crystallized precipitate is filtered, washed with water until the wash water has a pH of 9 to 10, and dried, for example by heating at a temperature of 50° C.

The faujasite containing $Li^+$ and $Na^+$ is activated by heating at temperatures ranging between 200 and 600° C., preferably between 300 and 350° C. under reduced pressure.

According to a preferred embodiment of the process of the invention a faujasite containing $Li^+$ and $Na^+$ cations is prepared having a $SiO_2/Al_2O_3$ molar ratio as high as possible for a given $SiO_2/Al_2O_3$ molar ratio in the amorphous crystallization mixture. It is advantageous to obtain zeolites having a high ratio $SiO_2/Al_2O_3$ because they are more stable at high temperatures and in acidic media.

This invention provides high silica contents, for it has been observed that for a given $Me_2O/Al_2O_3$ molar ratio ($Me_2O$ being either $Na_2O$ or $Na_2O+Li_2O$) in the amorphous mixture, the resultant crystallized faujasite will have a higher silica content if the amorphous mixture contains $Li_2O$ and $Na_2O$ than if the mixture contains only $Na_2O$. For example, in comparative tests two amorphous mixtures were heated at 100° C. during 72 hours under the same conditions. The first mixture had the following composition:

$$2.4Na_2O; Al_2O_3; 6SiO_2; 150H_2O$$

and the second one $$2.4(0.8Na_2O:0.2Li_2O); Al_2O_3; 6SiO_2; 150H_2O$$

In the first case, a faujasite containing only $Na^+$ and having a $SiO_2/Al_2O_3$ molar ratio equal to 3.90 was obtained and in the second case a faujasite containing $Na^+$ and $Li^+$ and having a $SiO_2/Al_2O_3$ molar ratio of 4.30 was obtained. This unexpected increase in the $SiO_2/Al_2O_3$ molar ratio is most noticeable for the lowest lithium contents, i.e. for $LiO_2/(Na_2O+LiO)$ ratio equal to or slightly superior to 0.05.

Furthermore, it has been found that using amorphous mixtures in which the molar ratio $Li_2O/Me_2O$ is between 0.05 and 0.5 and the molar ratio $H_2O/Al_2O_3$ is between 100 and 200, faujasites can be crystallized from weakly basic amorphous mixtures i.e., from mixtures in which the molar ratio $Me_2O/Al_2O_3$ is low. Under such conditions there is for each molar ratio of $SiO_2/Al_2O_3$ in the amorphous mixture a minimum molar ratio of $Me_2O/Al_2O_3$, as follows:

TABLE III

| Molar ratio $SiO_2/Al_2O_3$: | Minimum molar ratio $Me_2O/Al_2O_3$ |
|---|---|
| 2 | 1.45 |
| 3 | 1.5 |
| 4 | 1.6 |
| 5 | 1.8 |
| 6 | 2.2 |
| 7 | 2.6 |
| 8 | 2.9 |
| 9 | 3.1 |
| 10 | 3.3 |

For intermediate molar ratios of $SiO_2/Al_2O_3$, the corresponding minimum molar of $Me_2O/Al_2O_3$ can be obtained by interpolation. As known, fajasites having the highest $SiO_2/Al_2O_3$ ratios are precipitated from the least basic amorphous mixtures. It is therefore possible by adjusting the ratio of $Me_2O/Al_2O_3$ as a function of the ratio of $SiO_2/Al_2O_3$ to control the silica content of the faujasite containing $Na^+$ and $Li^+$, i.e., use the minimum value of $Me_2O/Al_2O_3$.

It must be noted, however, that for a molar ratio of $SiO_2/Al_2O_3$ higher than 10 the minimum value of $Me_2O/Al_2O_3$ in the amorphous mixture is already so high that there is practically no increase of the silica content of the faujasite when the amorphous mixture contains $Li_2O$. On the other hand, at values of the $SiO_2/Al_2O_3$ equal to or slightly above 2, the increase in the silica content of the faujasite is the most significant.

To sum up, faujasites containing $Li^+$ and $Na^+$ having the highest silica contents are crystallized from an amorphous mixture prepared according to the process of the invention having a molar ratio $Li_2O/Me_2O$ comprised between 0.05 and 0.5, a molar ratio $H_2O/Al_2O_3$ comprised between 100 and 200, and a minimum $Me_2O/Al_2O_3$ molar ratio corresponding to a given $SiO_2/Al_2O_3$ molar ratio as given in Table III.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

A commercial solution of sodium silicate (16.4 g.) having the following composition (in weight percent) 25.7% $SiO_2$; 7.35% $Na_2O$; 67.0% $H_2O$ is diluted with 35 cc. of water. Then the solution obtained is mixed with a solution of sodium aluminate containing 3.6 g.

$Al_2O_3$, 5.0 g. $Na_2O$, and 47 g. $H_2O$. The resultant gel has the following composition (in molar ratios):

| | |
|---|---|
| $SiO_2/Al_2O_3$ | 2 |
| $Na_2O/Al_2O_3$ | 2.8 |
| $H_2O/Al_2O_3$ | 140 |

After adding 23.5 g. of amorphous reactive silica in powdered form and 4.2 g. of lithium hydroxide $LiOH \cdot H_2O$, the molar ratios in the gel become:

| | |
|---|---|
| $SiO_2/Al_2O_3$ | 12 |
| $Li_2O/(Na_2O+Li_2O)$ | 0.2 |
| $(Na_2O+Li_2O)/Al_2O_3$ | 7 |
| $H_2O/Al_2O_3$ | 145 |

The mixture is heated at 95° C. for 18 hours without stirring. After filtration, washing and drying, a zeolite is obtained, having an X-ray diffraction diagram as shown in Table IV which when compared to natural calcium faujasite proves that it is also a faujasite.

After dehydration, the faujasite has the following composition:

$$0.85 Na_2O; \ 0.22 Li_2O; \ Al_2O_3; \ 5.2 SiO_2$$

It adsorbs 34.2% of water under a partial pressure of water of 13.5 mm. Hg at 25° C.

TABLE IV

| hkl | Synthesis faujasite (Li-Na) I/I₀ | Synthesis faujasite (Li-Na) $d_{hkl}$/ (A.) | Natural calcium faujasite from kaiserstuhl I/I₀ | Natural calcium faujasite from kaiserstuhl $d_{hkl}$/ (A.) |
|---|---|---|---|---|
| 111 | vS | 14.20±0.2 | vS | 14.4 |
| 220 | m | 8.81±0.05 | m | 8.78 |
| 311 | m | 7.47 | w | 7.49 |
| 222 | | | vw | 7.17 |
| 331 | mS | 5.67 | mS | 5.70 |
| 422 | | | vw | 5.06 |
| 333 and 511 | vw | 4.76±0.03 | m | 4.77 |
| 440 | m | 4.39 | S | 4.39 |
| 442 | vw | 4.16 | | |
| 620 | | | w | 3.91 |
| 533 | S | 3.78 | S | 3.78 |
| 444 | | | vw | 3.57 |
| 711 and 551 | vw | 3.463 | mw | 3.46 |
| 642 | mS | 3.318 | S | 3.310 |
| 731 and 553 | | | w | 3.238 |
| 733 | m | 3.033±0.01 | mw | 3.025 |
| 822 and 660 | w | 2.922 | mw | 2.919 |
| 751 and 555 | mS | 2.862 | S | 2.862 |
| 840 | | | mw | 2.769 |
| 664 | vw | 2.642 | | |

NOTE.—Intensity, I/I₀ symbols: vS=very strong, S=strong, mS= medium to strong, m=medium, mw=medium to weak, w=weak, vw=very weak.

EXAMPLE 2

A sodium aluminosilicate gel is prepared by agitating: (1) a sodium silicate solution containing 230 g. of amorphous hydrated silica with 10.4% $SiO_2$, 70 g. of sodium hydroxide and 2.1 l. of water, with (2) a solution of sodium aluminate containing 180 g. $Al_2O_3$, 230 g. $Na_2O$ and 2.3 l. of water.

The gel is filtered, washed with water and dried at 30° C. It has the following composition (by weight):

| | Percent |
|---|---|
| $SiO_2$ | 32.9 |
| $Al_2O_3$ | 22.6 |
| $Na_2O$ | 15.1 |
| $H_2O$ | 28.6 | corresponding to the following molar ratios:

| | |
|---|---|
| $SiO_2/Al_2O_3$ | 2.4 |
| $Na_2O/Al_2O_3$ | 1.1 |
| $H_2O/Al_2O_3$ | 7.2 |

By mixing 11.3 g. of this gel with 4.2 g. of amorphous reactive silica having a particle size lower than 50μ, 40 g. of water, 13 cc. of a 5 N sodium hydroxide solution and 16 cc. of 5 N lithium hydroxide, a new gel having the following molar ratios are obtained:

| | |
|---|---|
| $SiO_2/Al_2O_3$ | 5 |
| $Li_2O/(Li_2O+Na_2)$ | 0.4 |
| $(Na_2O+Li_2O)/Al_2O_3$ | 4 |
| $H_2O/Al_2O_3$ | 150 |

This mixture is maintained at a temperature of 60° C. for 12 days in a closed Pyrex flask. After filtration, washing and drying, the dehydrated faujasite (Li-Na) obtained has the following composition based on 1 mol of $Al_2O_3$:

$$0.68 Na_2O; \ 0.43 Li_2O; \ Al_2O_3; \ 4.7 SiO_2$$

In the anhydrous state this faujasite adsorbs 19.9% of n-hexane at 25° C. under a partial pressure of n-hexane of 102 mm. Hg.

EXAMPLE 3

By adding 4.2 g. of amorphous reactive silica, 10 cc. of water, 45 cc. of a solution of a 5 N sodium hydroxide and 14 cc. of a solution of a 5 N lithium hydroxide to 11.3 g. of a sodium aluminosilicate gel prepared as in Example 2, there is obtained a mixture having the following composition (in molar ratios):

| | |
|---|---|
| $SiO_2/Al_2O_3$ | 5 |
| $Li_2O/(Li_2O+Na_2O)$ | 0.2 |
| $(Li_2O+Na_2O)/Al_2O_3$ | 7 |
| $H_2O/Al_2O_3$ | 150 |

The mixture is maintained at a temperature of 30° C. for 15 days and it is thereafter filtered, washed with water and dried. The faujasite (Li-Na) thus obtained has the following composition (in molar ratios):

$$0.92 Na_2O; \ 0.11 Li_2O; \ Al_2O_3; \ 2.4 SiO_2; \ 5.9 H_2O$$

In the dehydrated state it adsorbs 16.4% of n-hexane at 60° C. under a partial pressure of 102 mm. Hg.

EXAMPLE 4

In 11.3 g. of sodium aluminosilicate prepared as described in Example 2, $Na^+$ cations are exchanged against $Li^+$ cations by contacting the gel 4 times during one hour with an aqueous solution of 2 N LiCl. The ratio $$Li_2O/(Li_2O+Na_2O)$$

in the gel is equal to 0.89 and ratio $(Li_2O+Na_2O)/Al_2O_3$ remains equal to 1.1. By adding to this exchanged gel a lithium hydroxide solution and amorphous reactive silica, an amorphous mixture is obtained in which the molar ratios are as follows:

| | |
|---|---|
| $SiO_2/Al_2O_3$ | 5 |
| $H_2O/Al_2O_3$ | 150 |
| $(Na_2O+Li_2O)/Al_2O_3$ | 3 |

The amorphous mixture is left to stand at ambient temperature for 24 hours and is then heated without agitation at 60° C. for 60 hours. It is filtered, washed with water until a pH lower than 8 is obtained, and dried at 80° C.

The faujasite Na-Li obtained has an X-ray diffraction diagram analogous to the diagram given in Table IV. Its molar chemical composition after dehydration is as follows:

$$0.08 Na_2O; \ 1.10 Li_2O; \ Al_2O_3; \ 4.5 SiO_2$$

EXAMPLE 5

In a first experiment, the following amorphous mixture in mols:

$$2.6 Na_2O; \ Al_2O_3; \ 7 SiO_2; \ 150 H_2O$$

was heated at 100° C. for 120 hours without any crystallization taking place. Crystallization could only be obtained with an amorphous mixture containing $2.9 Na_2O$ instead of $2.6 Na_2O$.

In a second experiment, the following amorphous mixture in moles was heated at 100° C.:

$$2.6(0.8Na_2O; 0.2Li_2O); Al_2O_3; 7SiO_2; 150H_2O$$

After 80 hours, a faujasite having a high degree of crystallinity and a molar ratio $SiO_2/Al_2O_3$ of 4.50 was precipitated. These comparative tests show clearly that in the presence of $Li_2O$ in the amorphous mixture, faujasite crystallizes from amorphous mixtures having a lower $Me_2O/Al_2O_3$ ratio.

EXAMPLE 6

In a first experiment, 24.58 kg. of sodium hydroxide (76% $Na_2O$) was dissolved in 79.5 l. of water. Into the resultant solution there was dissolved 22.68 kg. sodium aluminate (30.4% of $Na_2O$ and 46.5 $Al_2O_3$) under heat and agitation. After being cooled at ambient temperature, a suspension of colloidal silica containing 30% $SiO_2$ was added thereto, and a gel was obtained having the following molar composition:

$$4Na_2O; Al_2O_3; 10SiO_2; 160H_2O$$

After crystallization, 36.3 kg. of a hydrated faujasite having the following molar composition was obtained:

$$4Na_2O; Al_2O_3; 4.7SiO_2; 7H_2O$$

The yields based on the starting materials (by weight) were as follows:

| | Percent |
|---|---|
| Anhydrous material | 28.7 |
| $Na_2O$ | 15 |
| $Al_2O_3$ | 61.5 |
| $SiO_2$ | 28.9 |

In a second experiment, 10 kg. of a gel having the following composition (by weight):

| | Percent |
|---|---|
| $Na_2O$ | 15 |
| $Al_2O_3$ | 24 |
| $SiO_2$ | 34 |
| $H_2O$ | 27 | were prepared according to Example 2 by mixing 7.82 k.g. of sodium aluminate ($Al_2O_3$: 39%; $Na_2O$: 33%), 12.7 kg. sodium silicate ($SiO_2$: 28.3%; $Na_2O$: 6.8%; $H_2O$: 64.9%) and 92.5 liters of water.

To this gel, there were added 9 kg. of activated silica (81.1% by weight $SiO_2$), 2.20 kg. NaOH and 1.09 kg. $LiOH:H_2O$ (35% by weight $Li_2O$).

After crystallization, 14.20 kg. of hydrated faujasite having the following molar composition was obtained:

$$0.85Na_2O; 0.15Li_2O; Al_2O_3; 4.8SiO_2; 7.5H_2O$$

The yields based on the starting material (by weight) were the following:

| | Percent |
|---|---|
| Anhydrous material | 58 |
| $Na_2O$ | 25 |
| $Li_2O$ | 31 |
| $Al_2O_3$ | 76.5 |
| $SiO_2$ | 64.0 |

It can be seen that the yields are higher when the amorphous mixture contains $Li_2O$, than when it contains only $Na_2O$.

EXAMPLE 7

In a first experiment, there is heated at 100° C. an amorphous mixture having the following molar composition:

$$2.4Na_2O; Al_2O_3; 6SiO_2; 150H_2O$$

After 66 hours of heating, a faujasite crystallized having a $SiO_2/Al_2O_3$ ration of 3.90.

In a second experiment, an amorphous mixture having the following molar composition:

$$2.4(0.8Na_2O; 0.2Li_2O); Al_2O_3; 6SiO_2; 150 H_2O$$

is heated at 100° C. under the same conditions. The faujasite crystallized after only 48 hours and has a $SiO_2/Al_2O_3$ ratio of 4.50, proving that the addition of $Li_2O$ results in faster crystallization time and higher silica contents.

EXAMPLE 8

1st experiment

An amorphous mixture was prepared as in the second experiment of Example 6. The mixture had the following composition:

$$3.3(0.8Na_2O; 0.2Li_2O); Al_2O_3; 9SiO_2; 150H_2O$$

After 90 hours heating at 95° C., there was obtained a faujasite having a $SiO/Al_2O_3$ ratio of 4.50.

2nd experiment

An amorphous mixture having the following composition:

$$3.2(0.8Na_2O; 0.2Li_2O); Al_2O_3; 9SiO_2; 150H_2O$$

was prepared under the same conditions as the first experiment. After 90 hours of heating at 95° C., there was obtained a faujasite having a $SiO_2/Al_2O_3$ ratio of 5.10.

3rd experiment

An amorphous mixture having the following composition:

$$3.1(0.8Na_2O; 0.2Li_2O); Al_2O_3; 9SiO_2; 150H_2O$$

prepared under the same conditions.

The mixture was heated at 95° C. and after 120 hours of heating there was obtained a faujasite having a $SiO_2/Al_2O_3$ ratio of 5.60.

4th experiment

There was prepared an amorphous mixture under the same conditions having the following composition:

$$3.0(0.8Na_2O; 0.2Li_2O); Al_2O_3; 9SiO_2; 150H_2O$$

No faujasite could be crystallized by heating at 95° C. after 60 days.

The preceding examples can be repeated with similar success by substituting the generally or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the preparation of a face-centered cubic faujasite containing sodium and lithium cations, comprising:

(a) forming an aluminosilicate gel of the following composition and containing the total quantity of alumina necessary for said faujasite:

| | |
   |---|---|
   | $SiO_2/Al_2O_3$ | 1.5:1–3:1 |
   | $(Na_2O+Li_2O)/Al_2O_3$ | 0.08:1–3.5:1 |
   | $H_2O/Al_2O_3$ | 75:1–300:1 |

(b) adjusting the $SiO_2$, $Na_2O$, $Li_2O$ and $H_2O$ content of this first gel to obtain an amorphous mixture of the following composition:

| | |
   |---|---|
   | $SiO_2/Al_2O_3$ | 2:1–16:1 |
   | $(Na_2O+Li_2O)/Al_2O_3$ | 1.45:1–8:1 |
   | $Li_2O/(Na_2O+Li_2O)$ | 0.05:1–0.95:1 |
   | $H_2O/Al_2O_3$ | 75:1–300:1 | the $SiO_2$ content being adjusted by adding at least 0.5 mole of reactive silica, having a particle size of less than 100 microns, per 1 mole of $Al_2O_3$, and (c) precipitating from said amorphous mixture at a crystallization temperature of 20 to 105° C. a crystallized precipitate of faujasite.

2. A process according to claim 1 wherein the amorphous mixture has a molar ratio $Li_2O/Li_2O+Na_2O$ between 0.05 and 0.5, a molar ratio $H_2O/Al_2O_3$ between 100 and 200 and minimum molar values of $(Li_2O+NaO)/Al_2O_3$ corresponding to the molar ratio $SiO_2/Al_2O_3$, as follows:

| $SiO_2/Al_2O_3$: | Minimum $(Li_2O+Na_2O)/Al_2O_3$ |
|---|---|
| 2 | 1.45 |
| 3 | 1.5 |
| 4 | 1.6 |
| 5 | 1.8 |
| 6 | 2.2 |
| 7 | 2.6 |
| 8 | 2.9 |
| 9 | 3.1 |
| 10 | 3.3 |

3. A process according to claim 1 wherein the amorphous mixture is heated at a crystallization temperature of 20 to 100°C. to obtain a crystallized precipitate of faujasite.

4. A process according to claim 2 wherein the amorphous mixture is heated at a crystallization temperature of 60 to 100° C.

5. A process according to claim 1 wherein the amorphous mixture has a composition such that the ratio $Li_2O/[Na_2O+Li_2O]$ is higher than 0.5 and the amorphous mixture is heated to a temperature not exceeding 80° C. to obtain a crystallized precipitate of faujasite.

6. A process according to claim 1 wherein the first gel is prepared by adding a solution selected from the group consisting of sodium silicate, lithium silicate, and mixtures thereof to an aqueous solution of sodium aluminate.

7. A process according to claim 1 wherein the $Li_2O$ content of the amorphous mixture is adjusted by adding lithium hydroxide.

8. A process according to claim 1 wherein the $Li_2O$ content of the amorphous mixture is partially adjusted by ion exchange.

9. A process according to claim 1 wherein the molar ratio of $SiO_2/Al_2O_3$ is adjusted by adding silica having a particle size less than 50 microns.

10. A process according to claim 1 wherein the amorphous mixture is maintained at a temperature of 20 to 30° C. for 24 to 72 hours and then heated to a crystallization temperature higher than 30° C.

11. A process as defined by claim 1, the molar ratio of the gel in step (a) being:

| | |
|---|---|
| $SiO_2/Al_2O_3$ | 2:1–2.5:1 |
| $(Na_2O+Li_2O)/Al_2O_3$ | 1:1–2.8:1 |
| $H_2O/Al_2O_3$ | 100:1–200:1 |

12. A process as defined by claim 1, the molar ratio of the amorphous mixture in step (b) being:

| | |
|---|---|
| $SiO_2/Al_2O_3$ | 2:1–10:1 |
| $(Na_2O+Li_2O)/Al_2O_3$ | 1.45:1–3.5:1 |
| $Li_2O/(Na_2O+Li_2O)$ | 0.05:1–0.5:1 |
| $H_2O/Al_2O_3$ | 100:1–200:1 |

13. A process as defined by claim 1 wherein all of the $Li_2O$ required to produce the faujasite is added in step (b).

14. A process as defined by claim 1 wherein at least a portion of the $Li_2O$ required for the faujasite is incorporated in gel in step (a).

15. A process for the preparation of a face-centered cubic faujasite containing sodium and lithium cations, comprising:

(a) crystallizing at 20–105° C. said faujasite from an amorphous mixture of an aluminosilicate gel admixed with amorphous silica having a particle size of less than 100 microns, said amorphous mixture having at least 0.5 mole of said amorphous silica per mole of $Al_2O_3$ in the gel, said gel having the following compositions:

| | |
|---|---|
| $SiO_2/Al_2O_3$ | 1.5:1–3:1 |
| $(Na_2O+Li_2O)/Al_2O_3$ | 0.08:1–3.5:1 |
| $H_2O/Al_2O_3$ | 75:1–300:1 | said $Al_2O_3$ in the gel being the total quantity of alumina necessary for said faujasite, said amorphous mixture having the following molar ratios:

| | |
|---|---|
| $SiO_2/Al_2O_3$ | 2:1–16:1 |
| $(Na_2O+Li_2O)/Al_2O_3$ | 1.45:1–8:1 |
| $Li_2O/(Na_2O+Li_2O)$ | 0.05:1–0.95:1 |
| $H_2O/Al_2O_3$ | 75:1–300:1 |

References Cited
UNITED STATES PATENTS

| | | | |
|---|---|---|---|
| 3,415,736 | 12/1968 | Ciric | 423—329 X |
| 3,374,058 | 3/1968 | McDaniel et al. | 423—329 |
| 3,492,090 | 1/1970 | Jenkins | 423—329 |
| 3,510,258 | 5/1970 | Hindin et al. | 423—329 |

EDWARD J. MEROS, Primary Examiner

UNITED STATES PATENT OFFICE
CERTIFICATE OF CORRECTION

Patent No. 3,798,311        Dated   March 19, 1974

Inventor(s)  Jean-Louis GUTH, et al.

It is certified that error appears in the above-identified patent and that said Letters Patent are hereby corrected as shown below:

IN THE CLAIMS:

CLAIM 2, COLUMN 9, LINE 4:  "$(Li_2O+NaO)$" should read -- $(Li_2O+Na_2O)$ --

Signed and sealed this 13th day of August 1974.

(SEAL)
Attest:

McCOY M. GIBSON, JR.            C. MARSHALL DANN
Attesting Officer               Commissioner of Patents